(12) United States Patent
Gonzalez

(10) Patent No.: US 6,486,483 B2
(45) Date of Patent: Nov. 26, 2002

(54) ELECTRICAL ENERGY PRODUCTION SYSTEM

(76) Inventor: E. H. Gonzalez, P.O. Box 1321, Alice, TX (US) 78332

(*) Notice: Subject to any disclaimer, the term of this patent is extended or adjusted under 35 U.S.C. 154(b) by 0 days.

(21) Appl. No.: 09/749,828

(22) Filed: Dec. 28, 2000

(65) Prior Publication Data

US 2002/0084409 A1 Jul. 4, 2002

(51) Int. Cl.[7] .............................. H01J 00/00; F02G 1/00
(52) U.S. Cl. ........................ 250/526; 250/281; 60/643; 60/650
(58) Field of Search ................................. 250/281, 288, 250/425; 165/167; 60/643, 650, 641.1, 649, 423 R, 526

(56) References Cited

U.S. PATENT DOCUMENTS

| | | |
|---|---|---|
| 3,119,233 A | 1/1964 | Wattendorf et al. |
| 3,303,650 A | 2/1967 | Yonts |
| 3,554,669 A | 1/1971 | Reader |
| 3,975,651 A | 8/1976 | Griffiths |
| 4,095,118 A | 6/1978 | Rathbun |
| 4,146,800 A | 3/1979 | Gregory et al. |
| 4,766,312 A * | 8/1988 | Fergusson et al. .......... 250/281 |
| 5,005,361 A | 4/1991 | Phillips |
| 5,340,983 A * | 8/1994 | Deinzer et al. ............. 250/281 |
| 6,167,704 B1 * | 1/2001 | Goldenblum .............. 60/641.1 |
| 6,318,456 B1 * | 11/2001 | Brenner et al. ............. 165/167 |

* cited by examiner

*Primary Examiner*—Jack Berman
*Assistant Examiner*—Kalimah Fernandez
(74) *Attorney, Agent, or Firm*—Richard C. Litman

(57) ABSTRACT

An electrical energy production system, which includes an electrical energy production section, a multi-stage turbine section, and a mass spectrometer section is presented. The system is designed to produce electrical energy through a multi-stage turbine which draws in large volumes of ambient air through a series of tubular sections made up of repeated combinations of parallel plate or "frigid plate" heating assemblies and variable positive voltage grids. The tube sections cause the atoms or molecules of high velocity air flowing therethrough to undergo the loss of electrons through mechanically induced atomic and molecular impacts and thermal excitation. Free electrons are then collected by the variable positive voltage grids.

18 Claims, 14 Drawing Sheets

ELECTRICAL ENERGY PRODUCTION SYSTEM

BACKGROUND OF THE INVENTION

1. Field of the Invention

The present invention relates generally to a device for producing electrical energy and more particularly to an electro-mechanical apparatus for generating power through fluid ionization.

2. Description of the Related Art

Numerous apparatuses have been devised for energy conversion and production. Some of the most significant advances in the art have centered around thermal exciter units for forming a plasma, which can then be used to generate electricity. However, none of the references herein disclosed presents a device for producing energy through both the thermal and mechanical excitation of fluid ions, which also includes a multi-stage turbine section and a mass spectrometer section. For example, U.S. Pat. No. 3,119,233, issued to F. L. Wattendorf et. al., shows a multiple electrode arrangement for producing a diffused electrical discharge. The device includes a high velocity expansion nozzle, an assembly for providing high pressure gas, a central electrode, a plurality of sharply pointed electrodes, a source of cooling gas, and a source for applying a high alternating voltage. Electrical energy may be generated either as a direct or alternating current output.

U.S. Pat. No. 3,303,650, issued to O. C. Yonts, discloses an improved ion source system for providing a space charged neutralized beam for the ionic propulsion of a space vehicle having at least one pair of ion sources. Each of the sources includes a plurality of elongated cavities, a charge material disposed within the cavities, an A.C. heater mounted adjacent to the charge material in each cavity for heating and substantially completely ionizing the charge material, a source of A.C. power connected to each of the heaters, and an ion exit slit disposed in one wall of each of the cavities.

U.S. Pat. No. 5,005,361, issued to Phillips discloses a turbine powerplant which produces power from a high temperature plasma and high voltage electricity. A plurality of ion repulsion discharge chambers are situated along the perimeter of the turbine to accelerate the ions, and a condenser and pump are used to return the condensed gases back to a plasma generator.

U.S. Pat. No. 4,095,118, issued to Rathbun, relates to a solar energy conversion system which includes a centrally positioned tower supporting a solar receiver and an array of pivotally mounted reflectors disposed circumferentially therearound which reflect earth incident solar radiation onto the receiver, and which thermally excites and photo-ionizes a working fluid to form a plasma. The plasma is accelerated and further heated through a ceramic turbo-compressor into a magnetohydrodynamic generator to produce direct current.

U.S. Pat. No. 4,146,800, presents an apparatus and method of generating electricity from wind energy, which uses the earth as one of the plates of a condenser while the other plate is a fence-like structure through which the wind can blow from any direction.

U.S. Pat. No. 3,554,669, issued to Reador, discloses a device for converting electrical energy into fluid energy and vice/versa. The basic device is of a laminate structure comprised of two electrically conductive, channeled electrode members, an emitter, and a receiver, which are spaced a given distance from each other and joined between layers of electrically insulating material. The channels of the emitter and receiver are aligned so as to form a flow passage through the device. A direct current electric power supply is impressed between the emitter and receiver which causes fluid to be pulled from an inlet through the channels of the emitter and receiver and out an exit of the device.

U.S. Pat. No. 3,975,651, issued to Griffiths, relates to a method and apparatus for generating electrical energy either as a direct or alternating current output, wherein an electric current is passed axially through a continuous flow of electrically conductive fluid in a duct member. The fluid is moved at a high velocity so that the circumferential magnetic field due to the electric current travels with the fluid and induces radially directed electromotive forces and current flow in a further conductive device disposed exteriorly about the duct member.

None of the above inventions and patents, taken either singularly or in combination, is seen to describe the instant invention as claimed. Thus, an electrical energy production system solving the aforementioned problems is desired.

SUMMARY OF THE INVENTION

The invention is directed to an electrical energy system which includes an electrical energy production section, a multi-stage turbine section, and a mass spectrometer section. The apparatus of the invention is designed to produce electrical energy through a multi-stage turbine which draws in large volumes of ambient air through a series of tubular sections, which each include either a parallel plate heating assembly or a variable positive voltage grid. The tube sections cause the atoms or molecules of high velocity air flowing therethrough to undergo the loss of electrons through mechanically induced atomic and molecular impacts and thermal excitation. Free electrons are then collected by the variable positive voltage grids. The heat radiating parallel plates in each succeeding tube section progressively increase the temperature of the air to continue the ionization of the atoms and molecules.

Accordingly, it is a principal object of the invention to provide an electrical energy production system which produces electrical energy by ionizing ambient air.

It is another object of the invention to provide an electrical energy production system which also includes a mass spectrometer.

It is a further object of the invention to provide an electrical energy production system which includes an alternating series of heating assemblies and variable positive voltage grids.

Still another object of the invention is to provide an electrical energy production system which may serve as part of an ionic propulsion system.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention is directed to an electrical energy production system. The preferred embodiment of the invention is depicted in FIGS. 1–14 and is generally represented by numeral 15.

Figure 1:
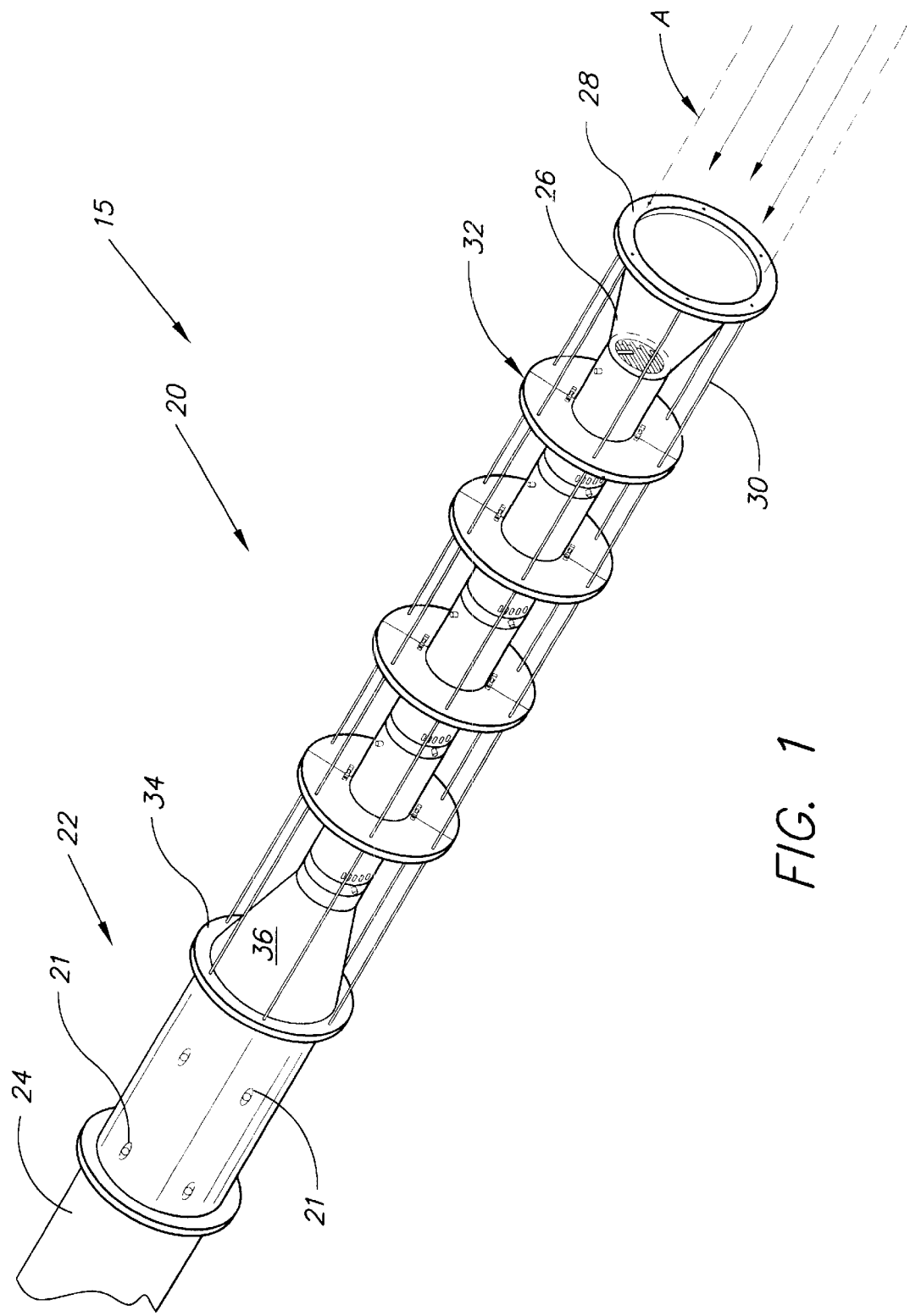
FIG. 1 is a side perspective view of an electrical energy production system according to the present invention.

Referring now to FIG. 1, it can be seen that the electrical energy system 15 includes an electrical energy production section 20, a multi-stage turbine section 22, and a mass spectrometer section 24. The apparatus of the invention is designed to produce electrical energy through use of a multi-stage turbine which draws in large volumes of ambient air through a series of tubular sections including repeated combinations of parallel plate or "rigid plate" heating assemblies and variable positive voltage grids. The system 15 causes the atoms or molecules of high velocity air flowing therethrough to undergo the loss of electrons through mechanically induced atomic and molecular impacts and thermal excitation. Free electrons are then collected by the variable positive voltage grids.

The heat radiating rigid plates in each succeeding tube section progressively increase the temperature of the air to continue the ionization of the atoms and molecules. As the air molecules start to loose electrons and become more positive, the system 15 automatically compensates for this phenomenon by increasing the positive voltage potential on the next succeeding variable positive voltage grid in the line of fluid flow to continue the electron disassociation process. Variable positive voltage generation circuits typically generate positive voltage that increases or decreases in accordance with an increase or decrease in the entered high-frequency power.

Mass spectrometers vary in internal and external design, and are used for atomic and molecular identification of chemical structures, determination of mixtures, and quantitative analysis, based on application. In the present invention the mass spectrometer 24 will be used to analyze atoms, molecules, and ions by size, weight, and electric charge, and then separate each element for subsequent ducting to separate storage chambers for later utilization. Thus, the mass spectrometer 24 may include any conventional means for separating and ducting charged particles, atoms, and molecules to storage chambers for applicable use. All mass spectrometers have four features in common: (1) an inlet system, (2) an ion source, (3) an analyzer, and (4) a detector. It should be understood that this application embraces all conventional mass spectrometers.

As indicated in FIG. 1, conventionally pre-filtered air is drawn into the apparatus through a primary reduction cone 26 located at its air receiving end and provided with a first lip 28 extending outwardly therefrom. The first lip 28 of the primary reduction cone 26 has a plurality of spaced-apart apertures arranged circumferentially therearound. Each aperture is dimensioned for receiving a connecting rod, generally 30. The connecting rods 30 are generally disposed parallel to the longitudinal axis of the apparatus 15 and through a series of supporting guide plates, generally 32. One end of the rod 30 fastens to the second lip 34 of a second cone 36, which joins the electrical energy production section 20 to the multi-stage turbine section 22. And the other end of the rod 30 fastens to the first lip 28 of the primary reduction cone 26. As shown in greater detail in FIG. 6, the connecting rod 30 is securely held in place by a nut 38. Outlets 21 for the routing of air lines and wiring of the electrical motors are also indicated in cross-section in FIG. 1. Air flow is generally indicated throughout the specification as the letter A.

Figure 3:
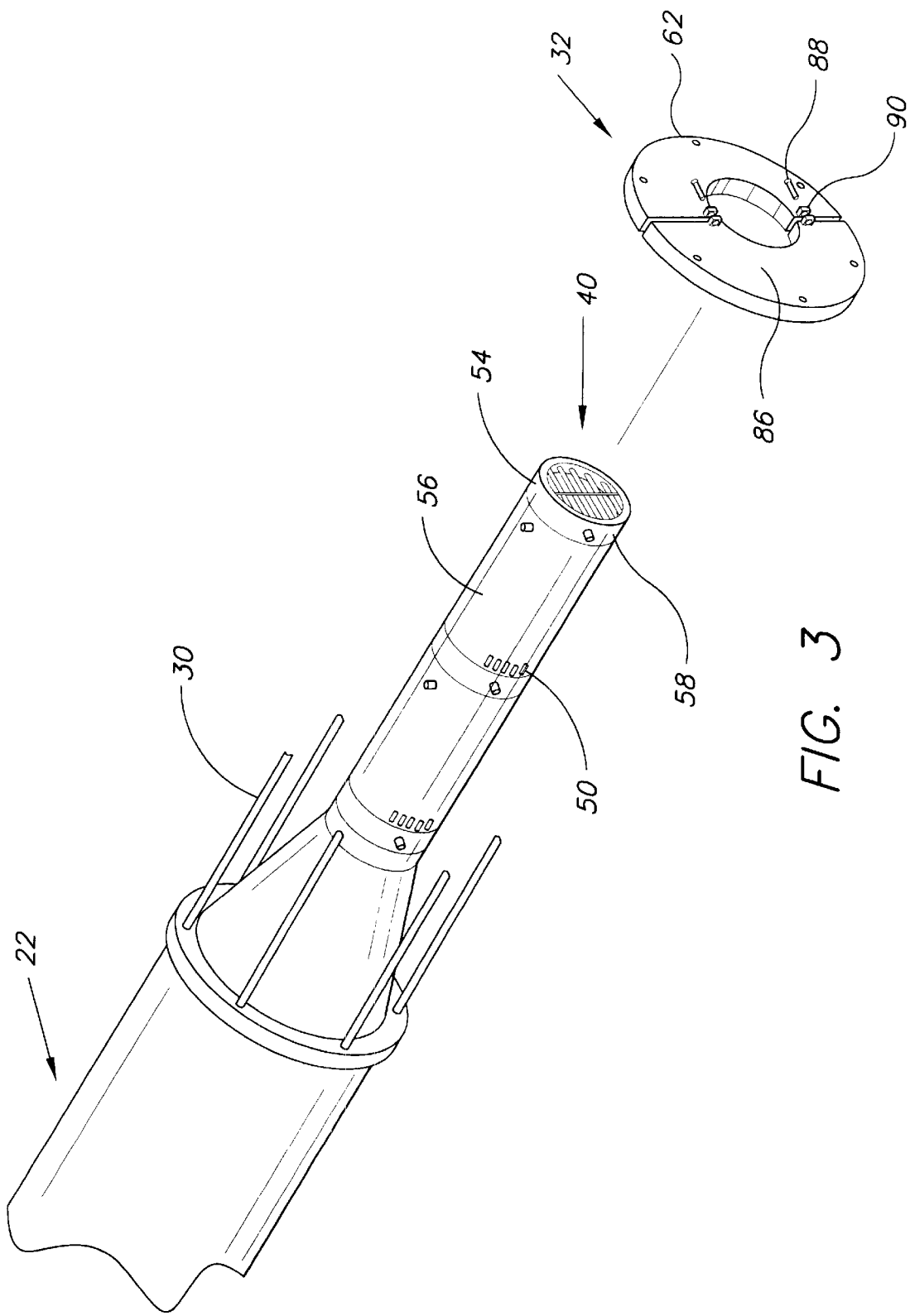
FIG. 3 is an exploded view of the connecting rods and guide plates, according to the invention.

Turning briefly to FIG. 3 for comparison to FIG. 1, the elongate tube 40 defined by the electrical energy production section 20 (when the guide plates 32 are removed) is smaller in diameter than the diameter defined by the respective lips, 28 and 34, of the primary 26 and secondary 36 cones, as well as the diameter of the housing of the turbine section 22. This decrease in volume causes an acceleration in the flow of air and minimizes the R.P.M.s on the multi-stage turbine 22. Nevertheless, a lower limit in the diameter of the elongate tube 40 is envisioned as the diameter must be large enough to allow a sufficiently high rate of air flow to raise the atoms and molecules from their normal electronic state to an excited electronic state in which electrons may be freed from their orbits and electrically attracted to the variable voltage positive grids for extraction and utilization.

Figure 2:
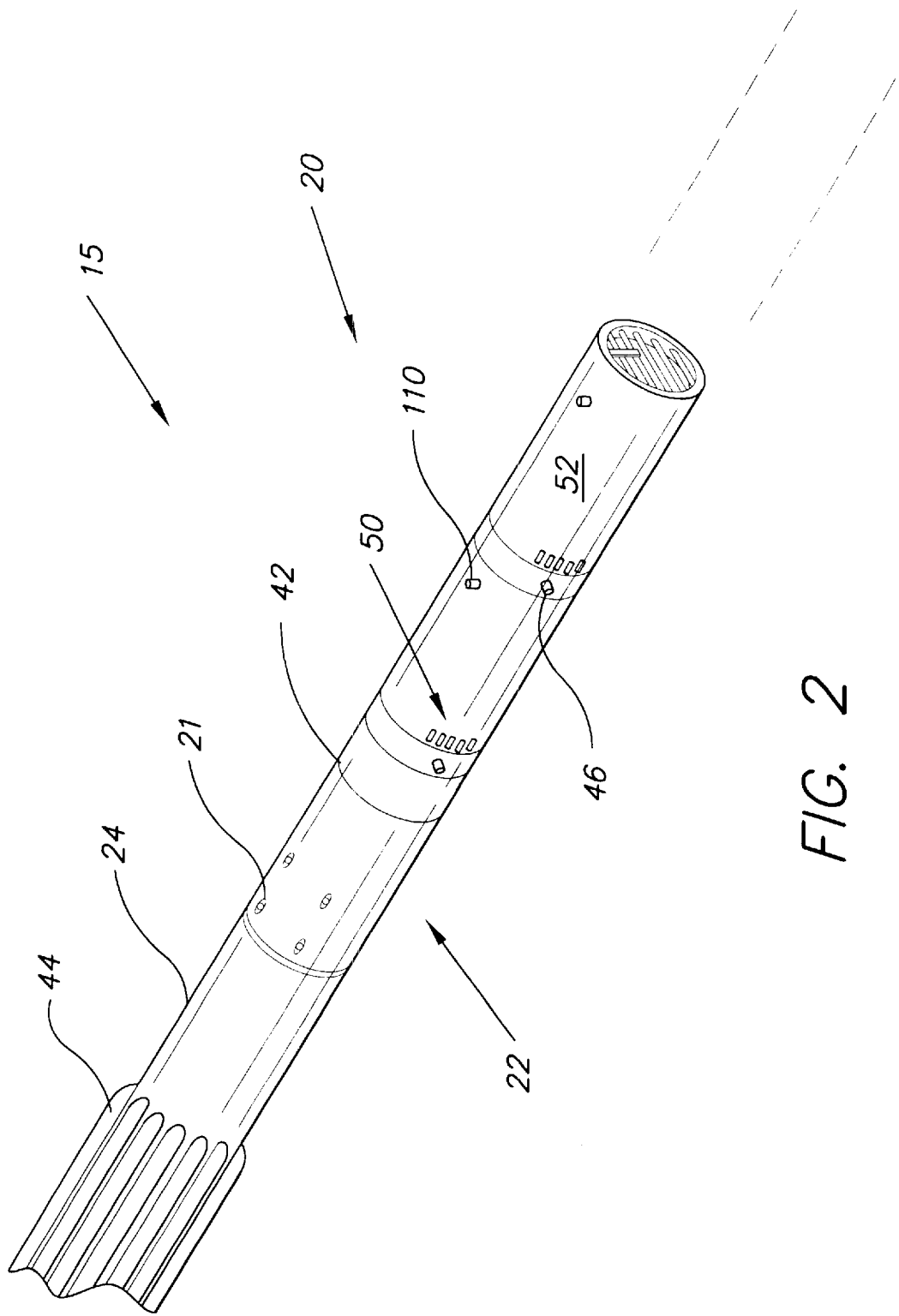
FIG. 2 is a side perspective view of a second embodiment of the electrical energy production system, according to the present invention.

FIG. 2 shows a second embodiment of the electrical energy production system 15 in which the diameter of the energy production section 20 is the same as the diameter of the turbine section 22. This variation in size will accommodate more volume of air flow, but the turbine 22 may have to run at higher R.P.M.s to raise the atoms and molecules to the necessary ionization potentials when flowing through the rigid plate tube sections. The multi-stage turbine section 22 and electrical energy production section 20 abut at joint 42, where they may be fixedly or removably attached. High pressure ducts, each generally 44, are shown at the rear of the mass spectrometer 24. Also shown in greater detail are the variable positive voltage grid studs 46, ion charge sensor studs 110, and rigid plate electrical connections 50, protruding through the generally cylindrical casing 52 of the electrical energy production section 20, to be discussed further hereinbelow.

FIG. 3 shows the preferred embodiment of the invention and the manner in which the guide plates 32 fit tightly over the connecting rods 30 and serve to hold the rigid plate sections 56 and variable positive voltage grid sections 54 together. Joints 58 and 60 indicate the extent of an individual rigid plate section 56, the variable positive voltage grid sections 54 abutting either side thereof. The guide plates 32 for the connecting rods 30 serve as a stabilizing collar around the rigid plate tube sections 56. These guide plates 32 closely abut the rigid plate tube sections 56, preventing any rotational movement, which could cause damage. As previously discussed, the connecting rods 30 are insertably received by the apertures, generally 62, disposed through each guide plate 32 and tightened at the ends thereof by means of a nut 38 threadably attached thereon. Upon assembly, the connecting rods 30 are tightened to seal the rigid plate 56 and variable positive voltage 54 sections together.

Figure 4:
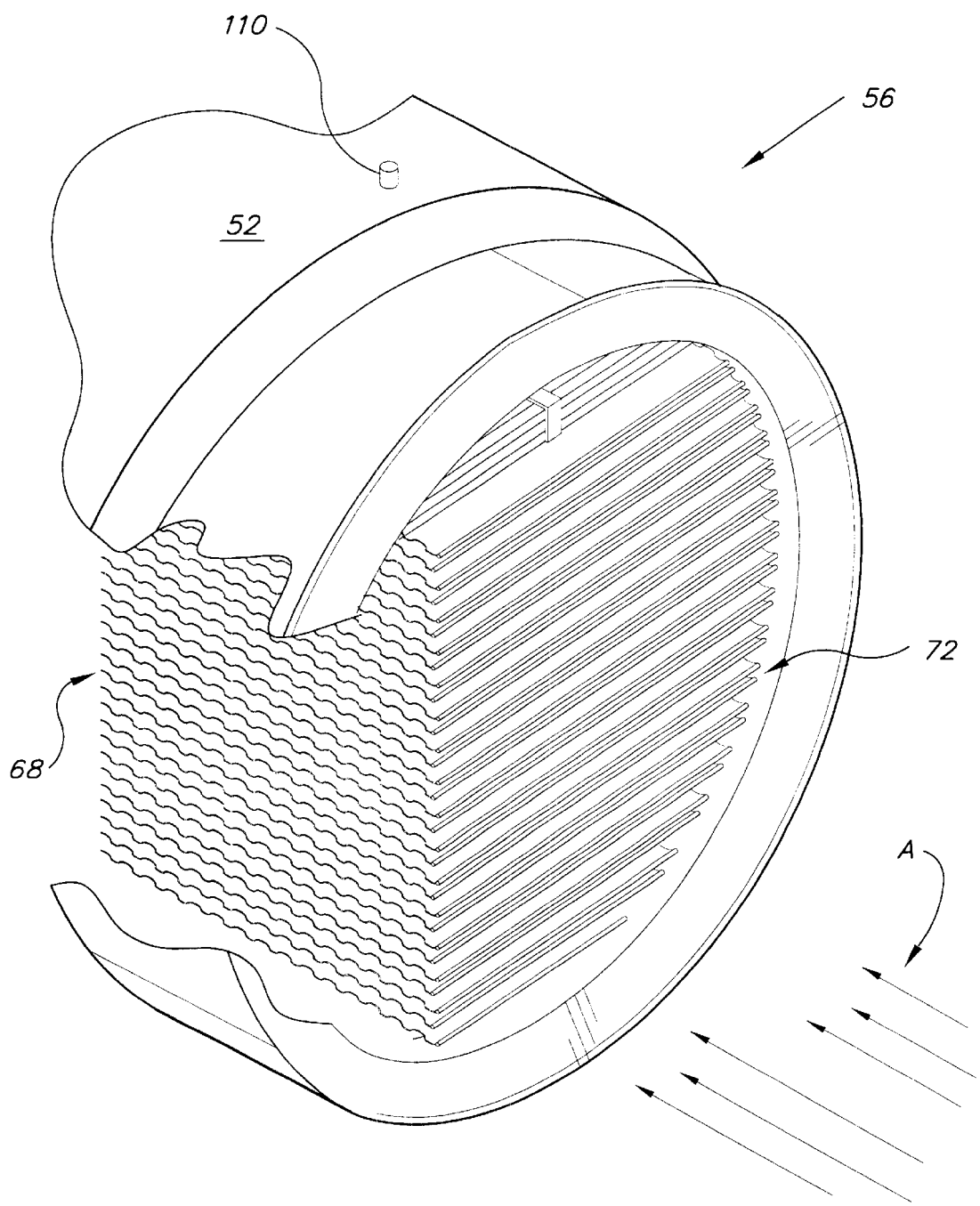
FIG. 4 is a cross-section of a rigid plate tube cross section, according to the invention.

Turning now to FIG. 4, it can be seen that the rigid plate tube sections 56 each include a plurality of metal alloy rigid plates 68 held in spaced-apart, parallel, relationship to each other and embedded in an electrical insulating casing material 52, such as a ceramic composition. The rigid plates 68 are preferably made of an electrically conductive material having excellent heat radiative properties, but able to withstand subsonic and supersonic shock wave pressures, produced by high velocity air flows A. The casing 52 will preferably be constructed of electrical insulating material also capable of withstanding subsonic and supersonic shock wave pressures produced by high velocity air flows. The leading and trailing edges of each rigid plate have an elongated rod or cylindrical end portion 72 disposed along the free edge thereof, substantially as shown, so as to maximize shock wave control. The cylindrical end portion 72 of each plate 68 protrudes through the casing 52, as generally indicated at 50 in FIG. 3.

Figure 11:
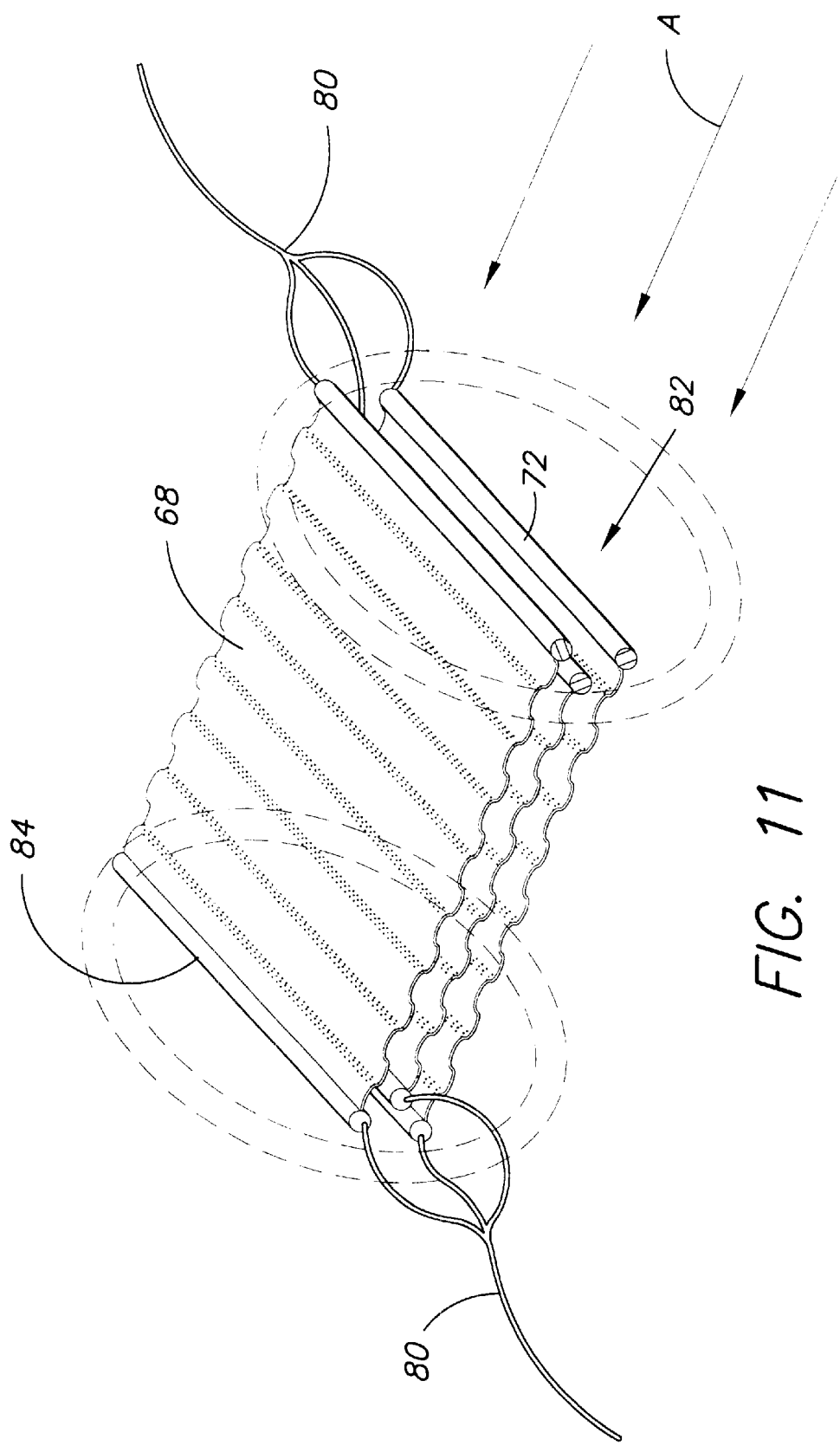
FIG. 11 is a perspective view of the rigid plates, according to the invention.

Turning briefly to FIG. 11, it can be seen that electrical wires 80 may be disposed on opposite ends of each plate 68 for the purpose of electrically heating the plates 68. As shown, the same construct will be on each plate on both the leading 82 and the trailing 84 edge, but will protrude on opposite sides of the casing 52 to provide a more thorough heat distribution on each plate.

It should be understood that in the preferred embodiment of the invention the series of electrical connections shown at 50 in FIG. 3 are disposed on both sides of each rigid plate section 56 but at opposite ends thereof, corresponding to the leading 82 and the trailing 84 edges. Also shown in FIG. 3 is the preferred embodiment of the guide plates 32, which include two mirror-image, disc-shaped structures 86, each having a half moon-shaped portion centrally removed from the linear side thereof. The guide plates 32 are dimensioned for being received over the electrical energy production section 20 and reversibly fastened together by a pair of bolts 88, insertably received by a pair of apertured, upstanding members, generally 90, when mutually aligned.

Again referring to FIG. 4, it should be noted that this figure shows only one of a number of possible designs that may be used to excite atoms and molecules to dissociation through high velocity air flows. The rigid plates 68 are positioned substantially parallel to one another and may vary in number. The number of rigid plates 68 contained within a particular tube section 52 may also vary, dependent on the size of the entire system 15 and the velocity of air flow. The sizes of the respective component parts of the invention vary in size depending on the application.

Furthermore, the invention is not limited regarding the number of repeated combination of variable positive voltage grids 54 and rigid plate sections 56. The rigid plates 68 may have conventional structural support elements, to help prevent implosion from high velocity air flows A. It should be understood that this specification embraces any structural support elements for the individual plates 68, whether located between a pair of plates 68, adjacent the plates 68, or otherwise located with respect thereto for improving resistance to material or structural degradation secondary to the effects of air flow.

Again referring to FIG. 11, it can now be clearly appreciated how the rigid plates 68 are preferably constructed to define a wavy pattern in cross-section, which, along with the characteristics of the metal alloy that give the plates excellent conductivity and heat radiating properties, makes them strong enough to withstand subsonic and supersonic shockwave pressures produced by high velocity air flows. FIG. 11 also more clearly shows the cylindrical end portions 72 of the leading 82 and trailing 84 edges. The cylindrical end portions 72 may vary in size as compared to the gauge of the plate 68. The cylindrical end portions 72 also substantially strengthen each plate 68. In the preferred embodiment, leading edge 82 provides a positive electrical lead and trailing edge 84 provides a negative electrical lead for heating the plates 68.

The spacing between each plate 68 is sufficient to allow supersonic air flow, if necessary, to attain atomic and molecular disassociation. The leading 82 and trailing 84 cylindrical end portions 72 of each plate 68 are further preferably staggered fore and aft with respect to each other and spaced-apart, substantially as shown, improving shock wave control.

Figure 5:
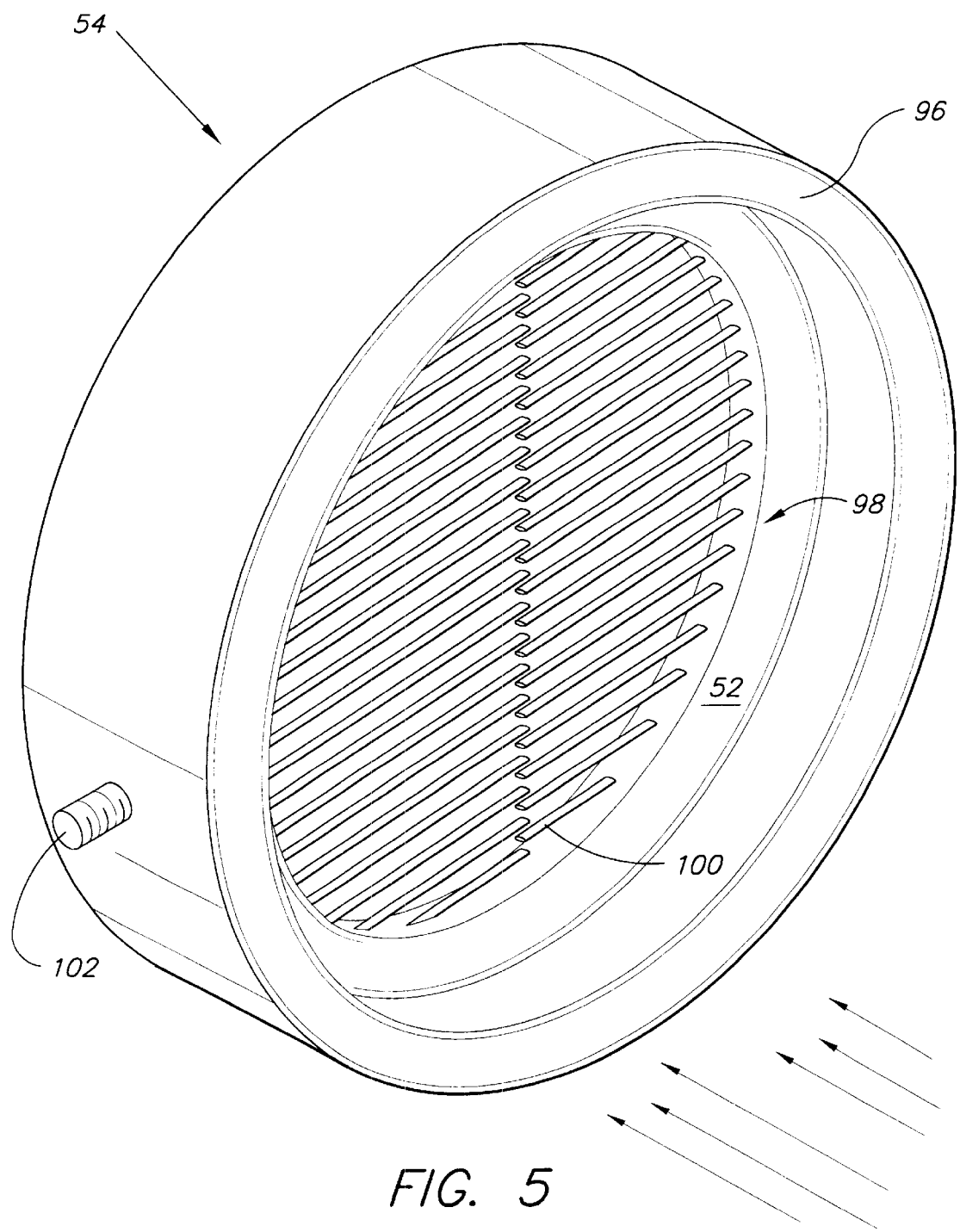
FIG. 5 is a side perspective view of a variable positive voltage grid, according to the invention.

In FIG. 5, the variable positive voltage section 54 is shown in greater detail. Made up of a generally rim-shaped structure 96 and an integral component of the casing 52, the variable positive voltage section 54 preferably includes two separate highly electrically conductive alloy grids, each 98. The individual vanes 100 on each grid 98 are embedded in the casing 52 and designed to withstand extreme high velocity air flows, and each grid 98 is commonly electrically connected to a stud 102 that protrudes through the casing 52 on the respective same side of the rim-shaped structure 96. The protruding studs 102, of which there are preferably two for each variable positive voltage section 54, are connected to a variable positive voltage potential, as diagrammatically indicated in FIG. 14. This variable positive voltage potential will extract the free electrons and will help accelerate the ions as they move through the tube sections, 54 and 56. The protruding studs 102 of each variable positive voltage grid 98 are preferably connected to a one way diode to prevent electrons from flowing back onto the grid 98. The positive voltage potential of each grid section 98 progressively increases to continue the process of ionization of the atoms and molecules, and helps to accelerate the ions.

Figure 6:
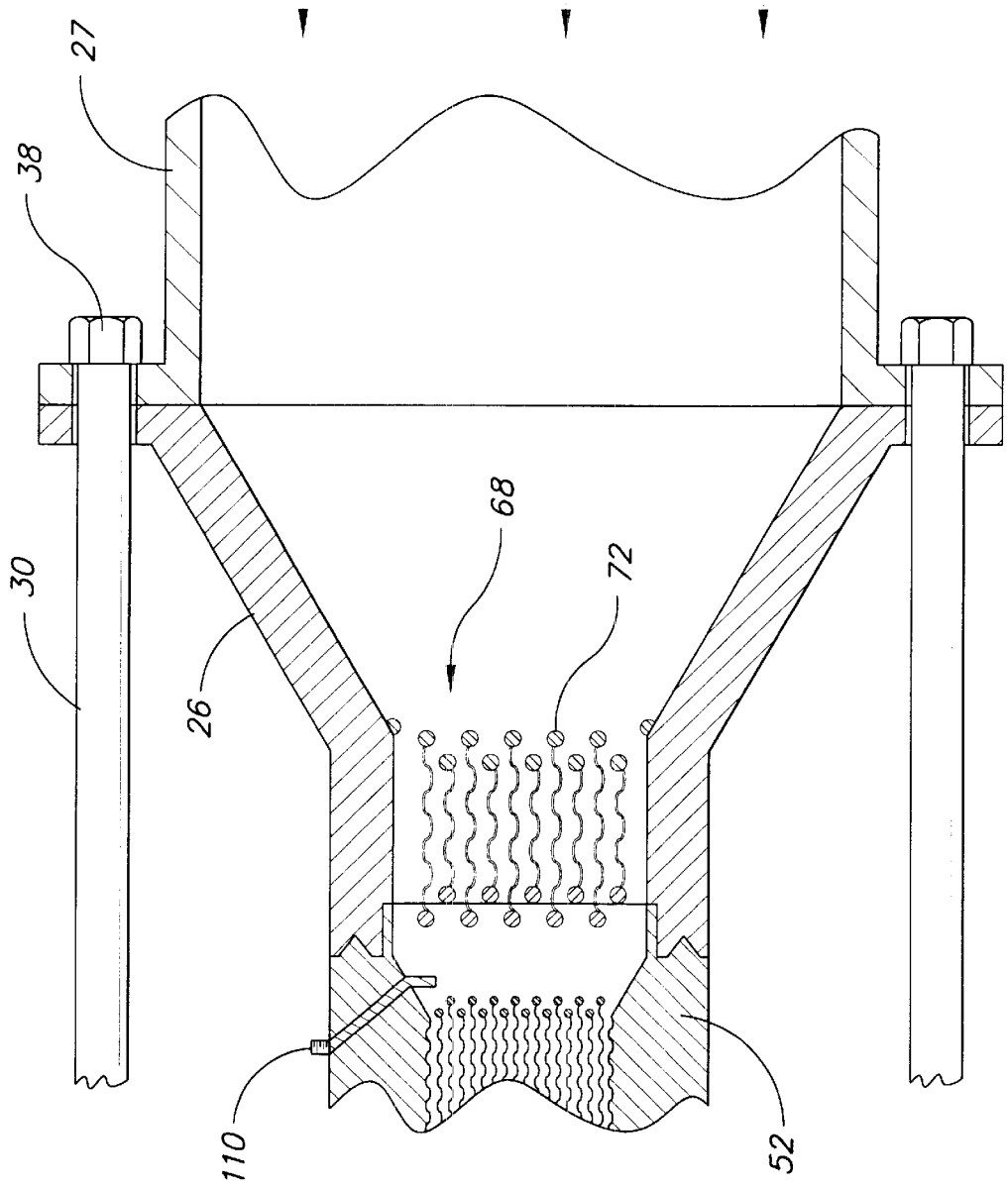
FIG. 6. is a cross-sectional view of a primary reduction cone, according to the invention.
Figure 8:
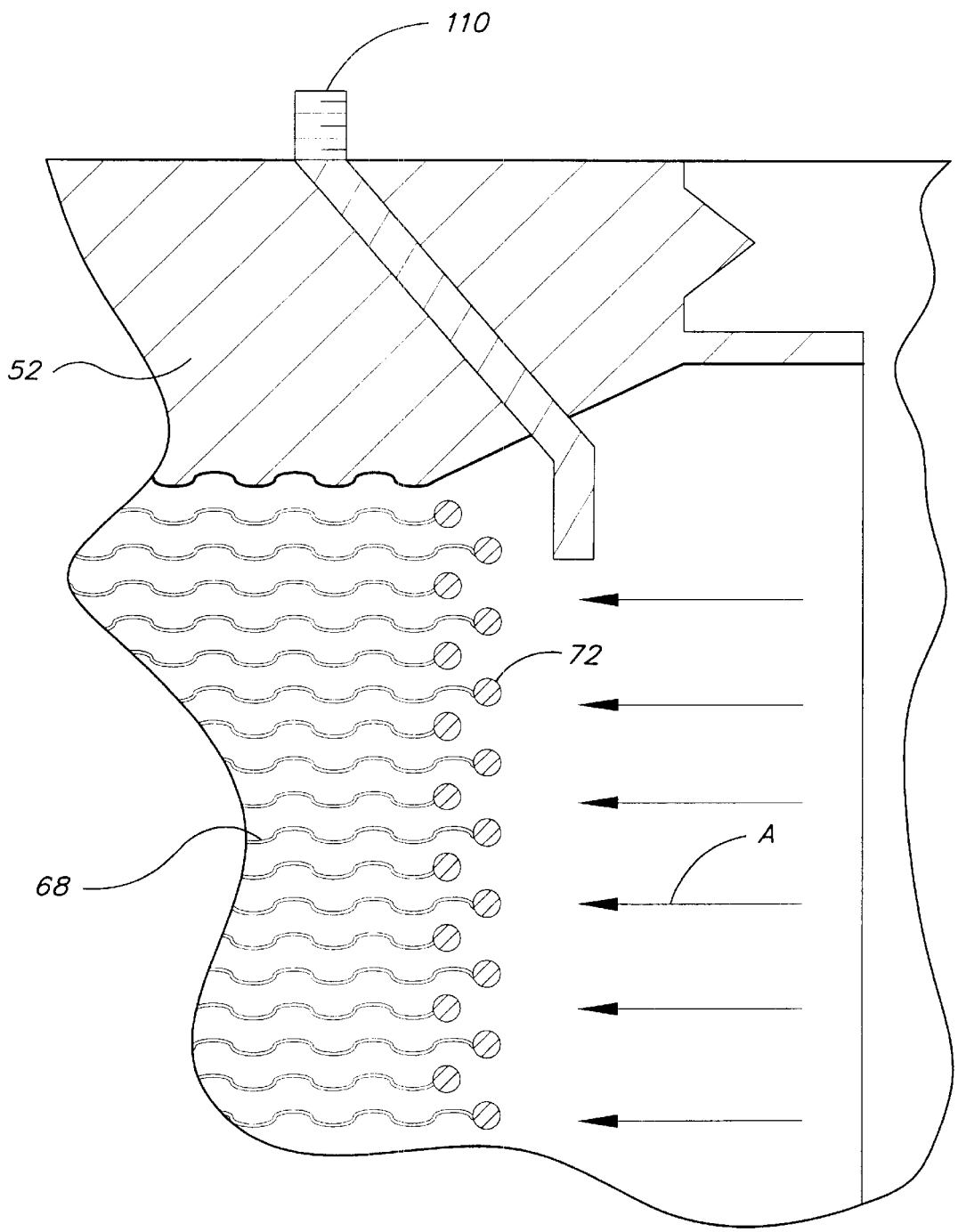
FIG. 8 is a cross-sectional view of the front portion of a rigid plate tube section.
Figure 9:
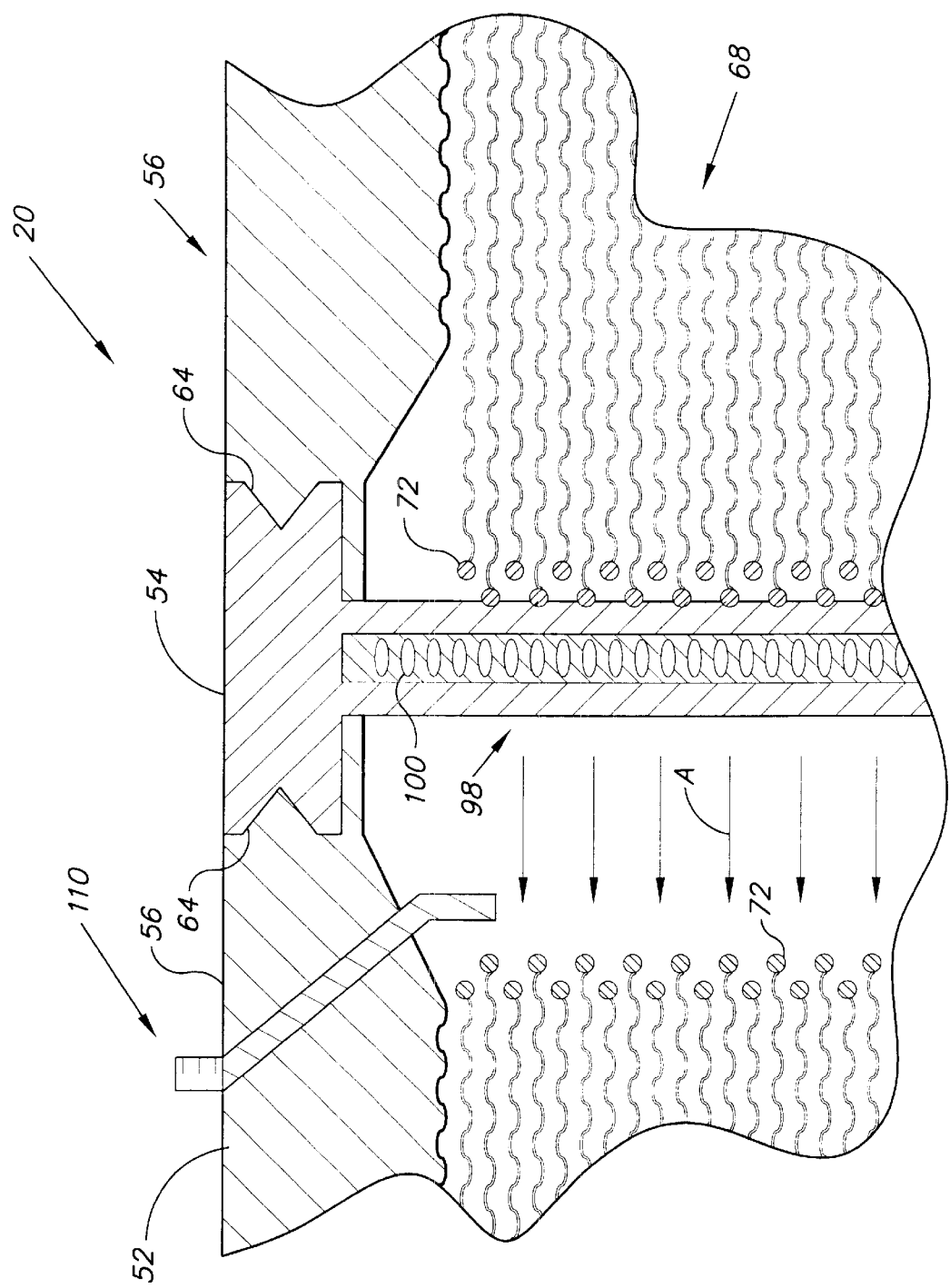
FIG. 9 is a cross-sectional view of the union of two rigid plate tube sections onto a variable positive voltage grid section, according to the invention.
Figure 14:
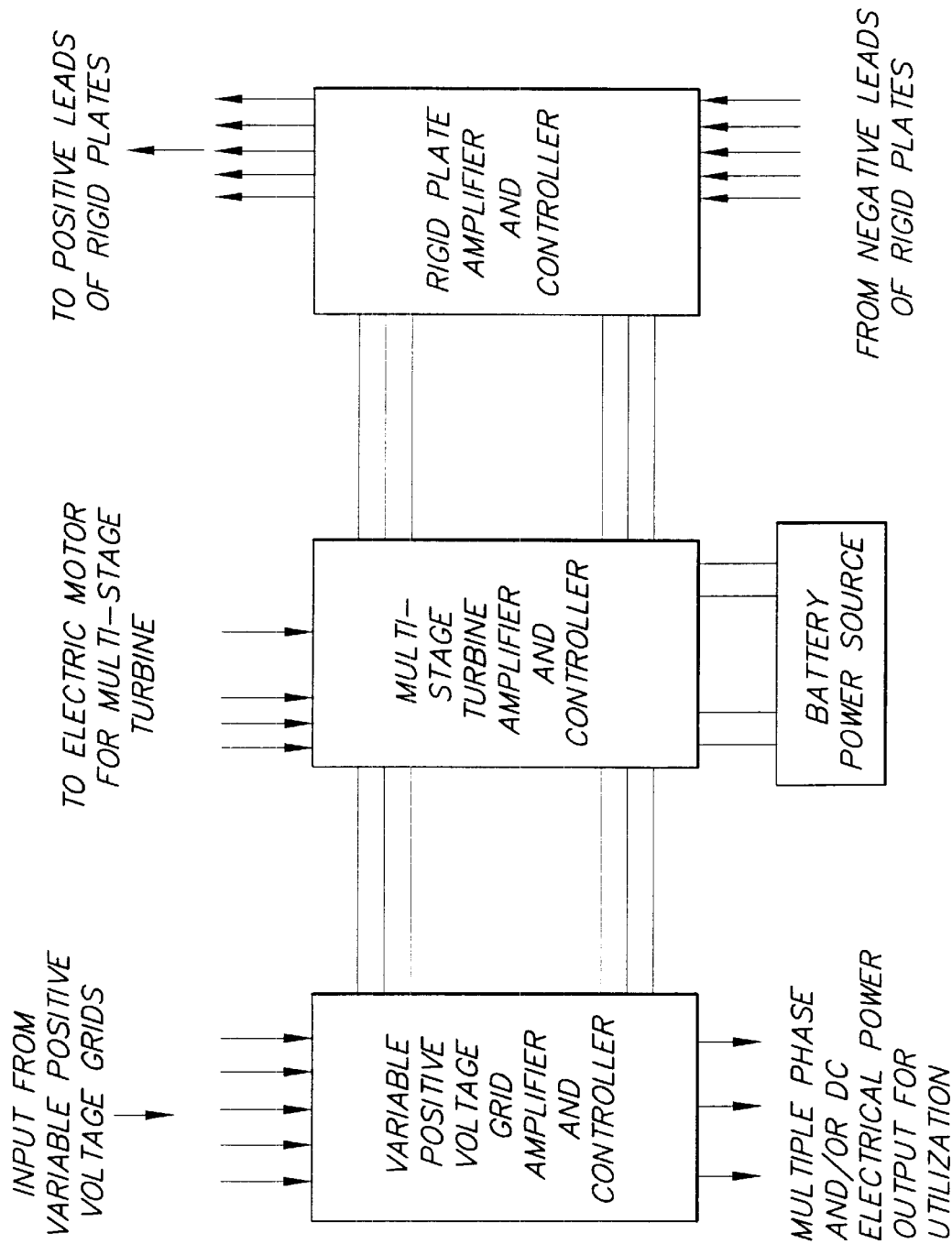
FIG. 14 is a block diagram of the electrical energy production system, according to the invention.

FIGS. 6, 8, and 9 illustrate the ion charge sensor elements 110 which are disposed through the casing 52 and detect the charge of the ions as they flow through the electrical energy production section 20 and automatically compensate (via the amplifier and controller as indicated in FIG. 14) to keep the variable positive voltage grids 98 in a greater positive potential as compared to the ions to help accelerate the flow and dissociation process. The ion charge sensors 110 are preferably configured to be aerodynamic and able to withstand supersonic airflows. Conventionally, ion detectors include a sensing electrode, an evaluating circuit, and an indicator means. In the preferred embodiment of the invention, the ion charge sensor 110 controls the variable positive grid to its immediate rear.

FIG. 6 shows the primary reduction cone 26 at the front of the first rigid plate tube section 56. The primary reduction cone 26 also has heated rigid plates 68, but the plates 68 are preferably larger and spaced further apart from one another, as compared to the rigid plate tube sections 56. The leading and trailing cylindrical elements 72 on the primary reduction cone 26 are arranged as shown to maximize shockwave control. FIG. 6 also shows the connecting rod 30 and nut 38 assembly at the front of the electrical energy production section 20, connecting the system 15 to an air conduit 27.

Figure 7:
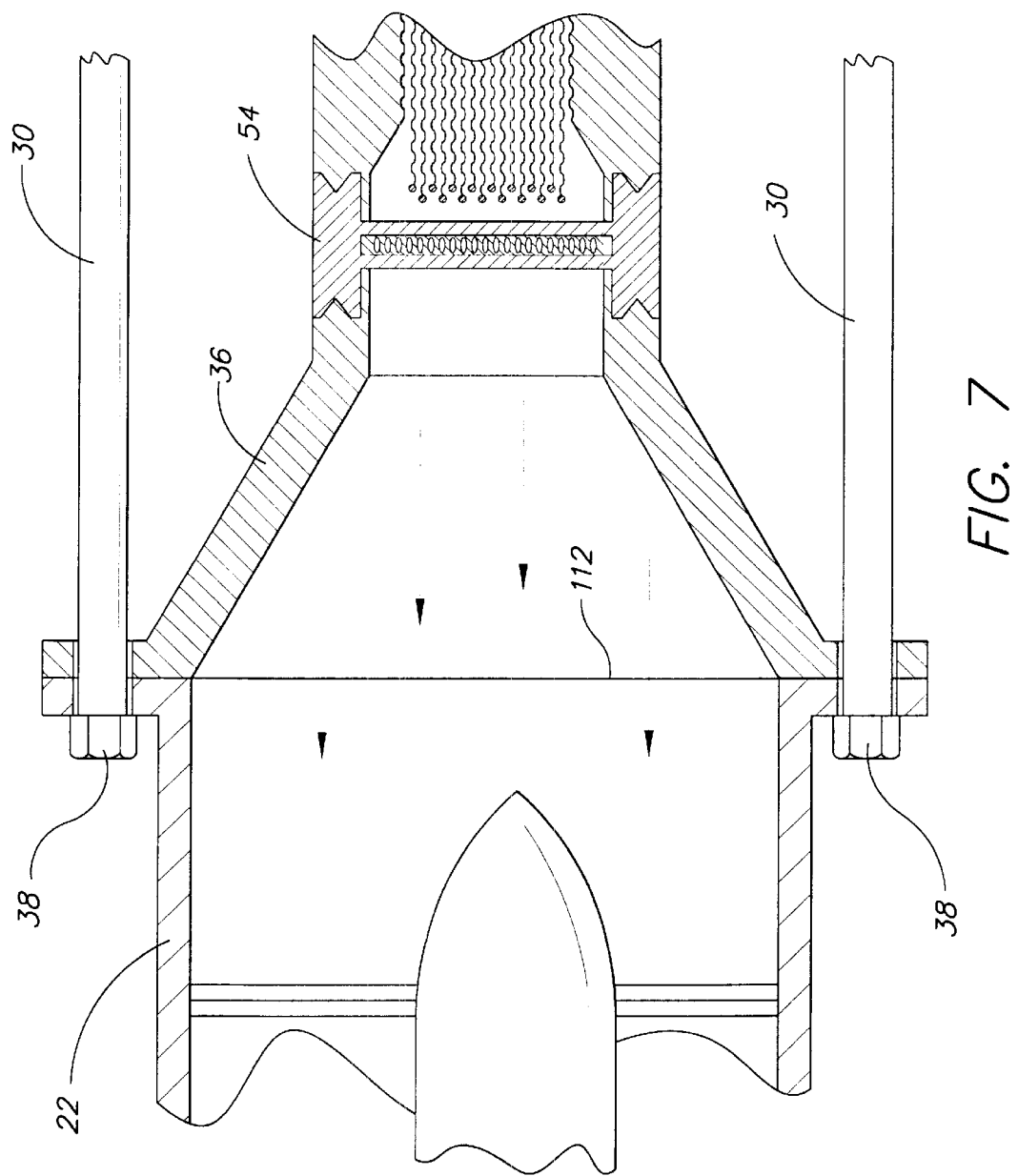
FIG. 7 is a cross-sectional view of the last section of the the electrical energy production system, according to the present invention.

FIG. 7 shows the secondary cone at the rear of the electrical energy production section 20 as well as the connecting rod 30 and nut 38 assembly at the rear of the electrical energy production section 20. The last section of the electrical energy production section 20 is preferably a variable positive voltage grid 54 to continue the extraction of free electrons before entering the multi-stage turbine section 22. The turbine section 22 and electrical energy production section 20 closely abut at joint 112.

Figure 10:
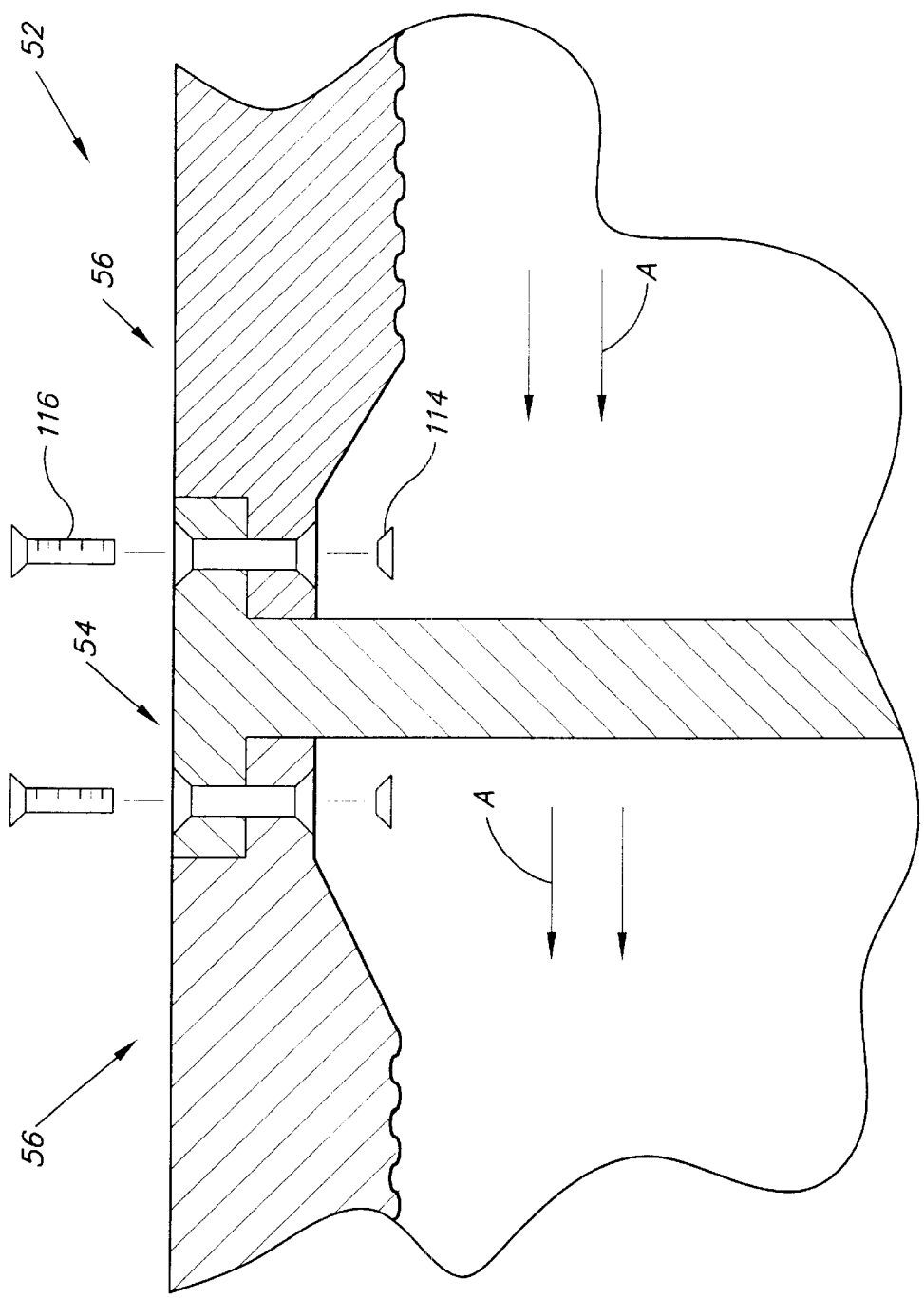
FIG. 10 is a cross-sectional view of the rigid plate tube sections and the variable positive voltage grid sections, according to the invention.

Referring again to FIG. 9, it can now be clearly appreciated how the various components of The casing 52 come together to support the variable positive voltage grid 54. After tightening the connecting rods 30, the compression design fittings, generally 64, connecting the various tube sections together, prevent leakage of the high velocity ionized air flow. The design of the leading and trailing edge casing fittings 64 are preferably of the compression type to prevent the need for drilling into the casing 52 for assembly of the electrical energy production section 20. For example, FIG. 10 shows a variation for uniting the rigid plate tube sections 56 onto the variable positive voltage grid sections. This alternative embodiment utilizes a nut 114 and bolt 116 assembly.

Again referring to FIG. 9, the cylindrical trailing edge 72 of each rigid plate section 56 should be in close proximity to the variable positive voltage grid 54 to immediately attract and extract the free electrons. The variable positive voltage potential, as well as the radiating heat of the rigid plates 68 may progressively increase from the front to the rear sections to continue the ionization and dissociation process. In one embodiment of the invention, the vanes 100 of the variable positive grid 98 may be parallel to the rigid plates 68 to maximize extraction of free electrons. Sensors 110 located in the rigid plate tube sections 56 will detect the charge of the ions at each stage and may automatically increase the potential of the variable positive voltage grids 98 to a higher positive potential as compared to the ions to help accelerate the velocity, increase dissociation, and have a greater potential for extracting electrons. The electrical energy production section 20 preferably starts with a rigid plate tube section 56 at its respective front to start the electron dissociation process, and ends with a variable positive voltage grid section 54 at its respective rear so as to continue the extraction of free electrons as much as possible. The process of extreme high velocity air flow through a repeated combination of rigid plate tube sections 56 and variable positive voltage grid sections 54 should create atomic and molecular disassociation and free electrons from their normal orbits; these free electrons will be attracted to the variable positive voltage grid 54 and extracted for utilization.

Figure 12:
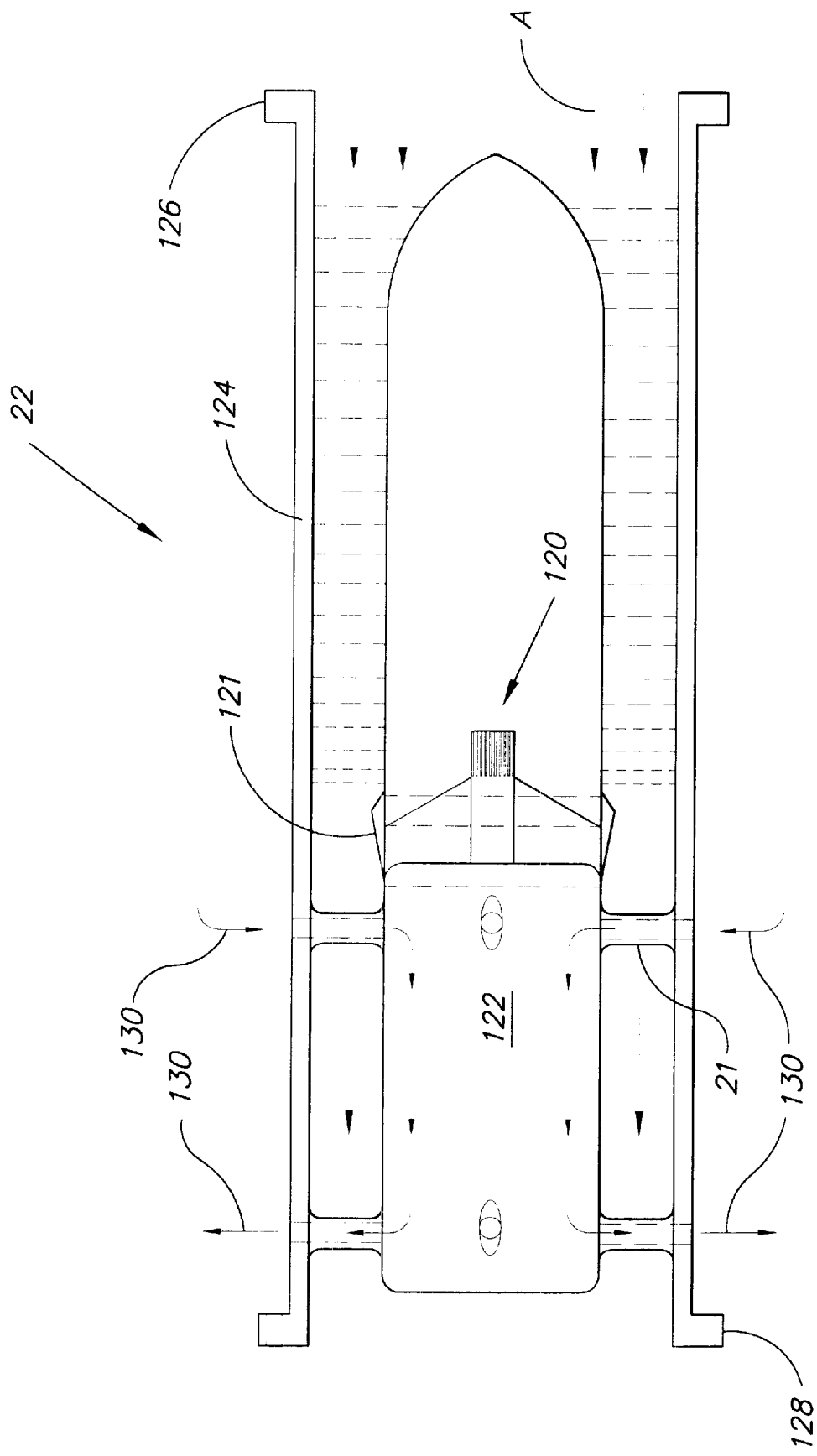
FIG. 12 is a cross-sectional view of a multi-stage turbine.
Figure 13:
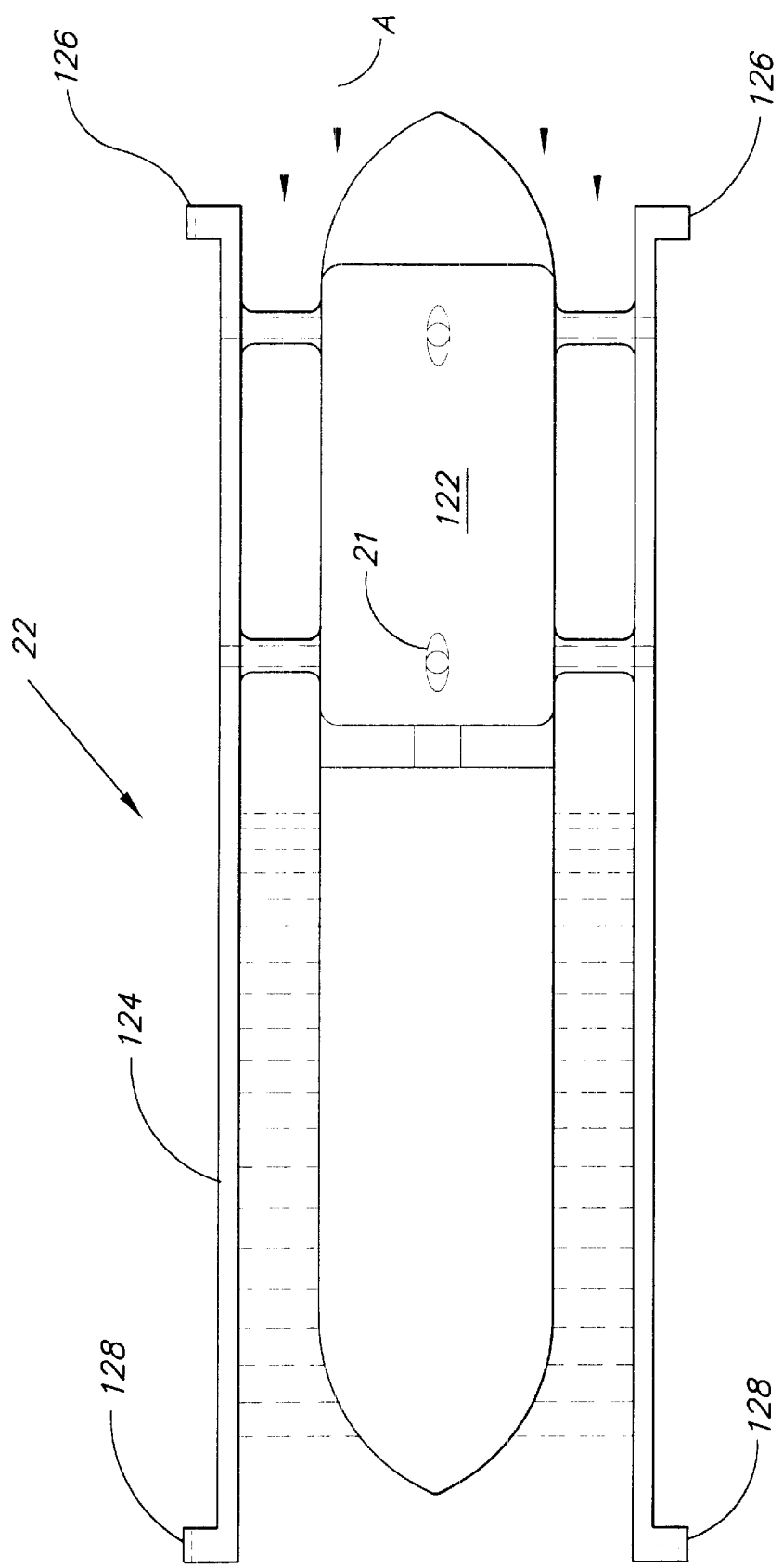
FIG. 13 is a cross-sectional view of a second embodiment of a multi-stage turbine.

FIG. 12 shows the electrically driven, multi-stage turbine section 22, though this specification embraces conventional turbines and other apparatuses for conducting or moving fluid through the system 15. This section 22 includes a multi-stage turbine 120 driven by an electric motor 122. The multi-stage turbine 120 itself is of a conventional type and may incorporate various designs to attain subsonic and supersonic air flows. Typically, multi-stage turbines can provide up to 15,000 horsepower and up to 15 stages. The electric motor 122 on FIG. 12 is positioned to the rear of the turbine 120. The electric motor mounts 21 will be aerodynamic and hollow to accommodate electrical connections and to provide cool air circulation for the motor and to the exterior of the turbine section housing 124, as indicated by the air flow arrows 130, but is strong enough to support the motor 122 and withstand supersonic air flow. The turbine section housing 124 is provided with at least one front 126 and rear 128 apertured flange for fastening the turbine section 22 to the electrical energy production section 20 and mass spectrometer 24, respectively. Shroud 121 is also shown attached to the multi-stage turbine 22. FIG. 13 shows a second embodiment of the multi-stage turbine section wherein the electric motor is mounted in front of the turbine.

FIG. 14 is a block diagram for electrically controlling the system. A battery may be used in conjunction with the system in order to make it electrically self-sufficient. Therefore, in an alternative embodiment of the invention, the motor that drives the multi-stage turbine may be a motor and electrical generator in combination; this alternative embodiment may be useful if insufficient power is produced by the electrical energy production section at low R.P.M.s, and it is necessary to acquire additional power to achieve the maximum R.P.M.s. Preferably, all components are electrically interconnected to maximize efficiency and power output from the electrical energy production section 20. Electrical controls for this system 15 are known in the prior art. And finally, the mass spectrometer section on FIG. 1 and FIG. 2 may have a separate electrical system for controlling that section of the whole apparatus.

It is to be understood that the present invention is not limited to the embodiments described above, but encompasses any and all embodiments within the scope of the following claims.

I claim:

1. An electrical energy production system comprising:
   an electrical energy production section including:
   a series of abutting tubular members configured for providing a central longitudinal path through said energy production section for a fluid, each of said tubular members including:
   a heating assembly including a plurality of heating plates for exciting said fluid to an elevated energy level, said plurality of heating plates disposed in spaced-apart relationship to allow the flow of said fluid through said assembly;
   a variable positive voltage grid for collecting charged particles; and
   at least one sensor for detecting the charge of said charged particles and for responsively controlling a potential of said grid; and
   input and output ends; and
   a multi-stage turbine connected to said output end.

2. The electrical energy production system of claim 1, further including a mass spectrometer connected to said multi-stage turbine.

3. The electrical energy production system of claim 1, further comprising a control means for responsively controlling each of said heating plates and each said grid.

4. The electrical energy production system of claim 1, further comprising an assembly for holding said abutting tubular members in abutting relationship, including a plurality of spaced-apart guide plates and a plurality of spaced-apart connecting rods, wherein said plurality of guide plates each define an opening for being received by said tubular members and fitted thereover, said plurality of guide plates each having a plurality of apertures circumferentially arranged thereon and dimensioned for insertably receiving one of said plurality of connecting rods.

5. The electrical energy production system of claim 1 wherein each said heating assembly has an increased heat at greater distances from said input, such that a fluid travelling through said series of members comes in contact with successively hotter assemblies.

6. The electrical energy production system of claim 1 wherein each said grid has an increased charge at greater distances from said input, such that a fluid travelling through said series of members comes in contact with successively greater charged grids.

7. An electrical energy production system comprising:
   an electrical energy production section, said electrical energy production section including a conduit for providing a path through said energy production section for a fluid, said conduit having a plurality of tubular members attached in a series and input and output ends, each of said tubular members having a heating assembly for exciting a fluid to an elevated energy level and a variable voltage grid for collecting charged particles from within said conduit;
   each said heating assembly having a temperature greater than the previous heat assembly, and each said grid having a greater voltage than the previous grid such that a fluid travelling through said conduit encounters a greater temperature and a greater voltage approaching said output of said conduit; and,
   a means for inducing flow of a fluid into said conduit.

8. The electrical energy production system of claim 7, further comprising a means for separating and ducting charged particle, atoms, and molecules to storage chambers for applicable use.

9. The electrical energy production system of claim 7, in combination with a mass spectrometer.

10. The electrical energy production system of claim 7, wherein said means for inducing flow of said fluid into said conduit means includes a turbine.

11. The electrical energy production system of claim 7, wherein said means for inducing flow of said fluid into said conduit means includes a multi-stage turbine.

12. The electrical energy production system of claim 7, wherein each said heating assembly includes a plurality of heating plates.

13. The electrical energy production system of claim 7, wherein said each said voltage grid is a positive voltage grid.

14. The electrical energy production system of claim 7, further comprising at least one sensor disposed in each of said tubular members for detecting the charge of ions and for responsively controlling each said voltage grid.

15. An electrical energy production system comprising:
   an electrical energy production section including:
      a series of abutting tubular members configured for providing a central longitudinal path through said energy production section for a fluid, each of said tubular members including:
         a heating assembly including a plurality of heating plates for exciting said fluid to an elevated energy level, said plurality of heating plates disposed in spaced-apart relationship to allow the flow of said fluid through said assembly;
         a variable positive voltage grid for collecting charged particles; and
         at least one sensor for detecting the charge of said charged particles and for responsively controlling a potential of said grid;
      wherein a fluid travelling through said series of tubular members encounters a plurality of heating assemblies, said heating assemblies having successively greater temperatures;
      wherein a fluid travelling through said series of tubular members encounters a plurality of voltage grids, said voltage grids having successively greater positive charges; and
   input and output ends; and
   a multi-stage turbine connected to said output end.

16. The electrical energy production system of claim 15, further including a mass spectrometer connected to said multi-stage turbine.

17. The electrical energy production system of claim 15, further comprising a control means for responsively controlling each of said heating plates and each said grid.

18. The electrical energy production system of claim 15 further comprising an assembly for holding said abutting tubular members in abutting relationship, including a plurality of spaced-apart guide plates and a plurality of spaced-apart connecting rods, wherein said plurality of guide plates each define an opening for being received by said tubular members and fitted thereover, said plurality of guide plates each having a plurality of apertures circumferentially arranged thereon and dimensioned for insertably receiving one of said plurality of connecting rods.

* * * * *